(12) United States Patent
Dandison et al.

(10) Patent No.: US 11,336,597 B1
(45) Date of Patent: *May 17, 2022

(54) TWO-WAY REAL TIME COMMUNICATION SYSTEM THAT ALLOWS ASYMMETRIC PARTICIPATION IN CONVERSATIONS ACROSS MULTIPLE ELECTRONIC PLATFORMS

(71) Applicant: Disintermediation Services, Inc., Mobile, AL (US)

(72) Inventors: John Patrick Francis Dandison, Charlotte, NC (US); James Allen Johnson, Mobile, AL (US); Paul Joseph Lyman Schottland, Matthews, NC (US)

(73) Assignee: Disintermediation Services, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,056

(22) Filed: Jan. 11, 2022

Related U.S. Application Data

(63) Continuation of application No. 17/036,709, filed on Sep. 29, 2020, now Pat. No. 11,240,183, which is a
(Continued)

(51) Int. Cl.
*H04L 51/04* (2022.01)
*H04L 51/56* (2022.01)
(Continued)

(52) U.S. Cl.
CPC .......... *H04L 51/04* (2013.01); *G06F 11/1612* (2013.01); *G06F 21/31* (2013.01);
(Continued)

(58) Field of Classification Search
CPC ....... H04L 51/04; H04L 51/066; H04L 51/36; H04L 65/1006; H04L 67/02; H04L 67/14;
(Continued)

(56) References Cited

U.S. PATENT DOCUMENTS 7,346,671 B2   3/2008   Hankejh et al.
8,438,227 B2   5/2013   Mo et al.
(Continued)

FOREIGN PATENT DOCUMENTS

WO   WO-2013059199   4/2013

OTHER PUBLICATIONS

Features—Jappix Project, https://jappix.org/features.html, last accessed Dec. 1, 2021.
(Continued)

*Primary Examiner* — Arvin Eskandarnia
*Assistant Examiner* — Chhian (Amy) Ling

(57) ABSTRACT

Methods, systems, and apparatuses, including computer programs encoded on computer-readable media, for receiving a first communication as part of a conversation, from an unauthenticated user of a web browser. A conversation identifier is determined based on the first communication. A first responder, a communication protocol, and a communication address of the first responder is determined. The first communication is sent to the first responder and a first reply is received. The conversation identifier is determined based on the first reply and the first reply is mapped to the web browser. The first reply is sent to the web browser.

20 Claims, 4 Drawing Sheets

Related U.S. Application Data continuation of application No. 15/892,129, filed on Feb. 8, 2018, now Pat. No. 10,841,253, which is a continuation of application No. 14/814,337, filed on Jul. 30, 2015, now Pat. No. 9,894,019, which is a continuation of application No. 13/653,119, filed on Oct. 16, 2012, now Pat. No. 9,106,599.

(60) Provisional application No. 61/627,714, filed on Oct. 17, 2011.

(51) Int. Cl.

| | | |
|---|---|---|
| *H04L 67/141* | (2022.01) | |
| *H04L 65/10* | (2022.01) | |
| *H04L 67/14* | (2022.01) | |
| *H04L 69/18* | (2022.01) | |
| *G06F 11/16* | (2006.01) | |
| *H04L 67/02* | (2022.01) | |
| *G06F 21/31* | (2013.01) | |
| *H04L 51/066* | (2022.01) | |
| *H04L 51/02* | (2022.01) | |

(52) U.S. Cl.
CPC ............ *H04L 51/066* (2013.01); *H04L 51/36* (2013.01); *H04L 65/1006* (2013.01); *H04L 67/02* (2013.01); *H04L 67/14* (2013.01); *H04L 67/141* (2013.01); *H04L 69/18* (2013.01); *H04L 51/02* (2013.01)

(58) Field of Classification Search
CPC ....... H04L 67/141; H04L 69/18; H04L 51/02; G06F 11/1612; G06F 21/31
See application file for complete search history.

(56) References Cited

U.S. PATENT DOCUMENTS

| | | |
|---|---|---|
| 8,472,612 B1 | 6/2013 | Goringe et al. |
| 8,631,078 B2 * | 1/2014 | Wherry .............. H04L 65/1069 709/206 |
| 8,880,627 B2 | 11/2014 | Davenport et al. |
| 9,015,155 B2 | 4/2015 | Levinson et al. |
| 9,106,599 B2 | 8/2015 | Dandison et al. |
| 9,473,638 B1 | 10/2016 | Billman |
| 9,894,019 B2 | 2/2018 | Dandison et al. |
| 2005/0105712 A1 | 5/2005 | Williams |
| 2007/0033249 A1 | 2/2007 | Samdadiya et al. |
| 2008/0080677 A1 | 4/2008 | Samdadiya et al. |
| 2008/0133671 A1 | 6/2008 | Kalaboukis |
| 2008/0262911 A1 | 10/2008 | Altberg et al. |
| 2008/0263446 A1 | 10/2008 | Altberg et al. |
| 2009/0063188 A1 | 3/2009 | Schoenberg |
| 2009/0198562 A1 | 8/2009 | Wiesinger et al. |
| 2009/0204673 A1 | 8/2009 | Tian et al. |
| 2010/0088607 A1 | 4/2010 | Dumpeti et al. |
| 2010/0312836 A1 | 12/2010 | Serr et al. |
| 2011/0003585 A1 | 1/2011 | Wang |
| 2011/0055309 A1 | 3/2011 | Gibor et al. |
| 2012/0297031 A1 | 11/2012 | Danielsson Fan |
| 2013/0024786 A1 | 1/2013 | Dayal |
| 2014/0250145 A1 * | 9/2014 | Jones .................. G06F 16/3329 707/769 |
| 2016/0044142 A1 | 2/2016 | Hsiao et al. |
| 2018/0167343 A1 | 6/2018 | Dandison et al. |

OTHER PUBLICATIONS

GitHub—Jappix/jappix: Jappix, a full-featured XMPP web-client (Jappix Desktop, Jappix Mobile & Jappix Mini)., https://github.com/jappix/jappix, last accessed Dec. 1, 2021.

* cited by examiner

TWO-WAY REAL TIME COMMUNICATION SYSTEM THAT ALLOWS ASYMMETRIC PARTICIPATION IN CONVERSATIONS ACROSS MULTIPLE ELECTRONIC PLATFORMS

CROSS REFERENCE TO RELATED APPLICATIONS

This application is a continuation of U.S. application Ser. No. 17/036,709, filed Sep. 29, 2020, which is a continuation of U.S. application Ser. No. 15/892,129, filed Feb. 8, 2018, now U.S. Pat. No. 10,841,253, which is a continuation of U.S. application Ser. No. 14/814,337, filed Jul. 30, 2015, now U.S. Pat. No. 9,894,019, which is a continuation of U.S. application Ser. No. 13/653,119, filed Oct. 16, 2012, now U.S. Pat. No. 9,106,599, which claims the benefit of U.S. Provisional Application No. 61/627,714, filed Oct. 17, 2011, all of which are incorporated by reference herein in its entirety.

BACKGROUND

The following description is provided to assist the understanding of the reader. None of the information provided or references cited is admitted to be prior art.

Real-time communication (RTC) is the generalized term for multiple systems which allow real time, or near real-time exchange of information over various protocols. The most common categories of RTC include instant messaging and text messaging. Electronic mail can be used for RTC as well, though it is slightly slower than the other media of RTC. The critical element of RTC comes in the nearly instant exchange of information using internet or telecommunications protocols.

The instant messaging category of RTC allows real-time text-based chat communication between two or more people using computing devices. Typically, instant messaging operates in a push mode where chats are sent directly to the receiver without the receiver having to poll for data. Instant messaging can enable people to chat over a network, such as the internet. In addition, some instant messaging clients allow for other features such as live voice, file sharing, video calls, etc.

The text messaging category of RTC is commonly called SMS ("Short Message Service") and is a text messaging service component of phone, web, or mobile communication systems, that uses standardized communication protocols that allow the exchange of short text messages between the devices. RTC and SMS also include additional instant messaging technologies such as multimedia messaging services (MMS) which extends the RTC capabilities onto the mobile telephone network of devices. Using MMS, photos, videos, ringtones, etc., can be sent to mobile devices. The electronic mail category of RTC is commonly called email, and allows an author to exchange of digital messages with one or more recipients. The digital messages can include attachments such as image files, video files, and/or other documents.

Known systems have been used to provide RTC communications. The traditional methods for the RTC communications include but are not necessarily limited to: (1) both parties sharing a common communications protocol (email, text messaging/SMS, instant messaging, etc.); (2) the initiating party being required to know the recipients addresses or other identifying information prior to being able to initiate a communication; (3) both parties being identified to the other during the course of the communication by the RTC systems.

While RTC can be utilized in a number of different ways on various computing devices, the various modes of RTC are not interconnected. For example, two people chatting must use the same communication protocols and, in some instances, the same software to be able to chat.

SUMMARY

In general, one aspect of the subject matter described in this specification can be embodied in methods for receiving from each of a plurality of responders conversation selection criteria and a mode of communication information that includes at least one of an email address, a telephone number, or an instant message identifier. A request for a conversation is received, from an initiator using a first communication mode, that includes conversation information that identifies a topic of the conversation, but does not identify any responders. A conversation identifier associated with the request is created. One or more possible responders are determined based at least upon the topic of the conversation and the conversation selection criteria. A mode of communication is determined for each of the one or more possible responders based at least on the received mode of communication information. The topic of the conversation is sent to the one or more possible responders, without identifying the initiator, using the determined mode of communication associated with each of the one or more possible responders. The initiator is anonymous to each of the one or more possible responders. At least one of the determined modes of communication of the one or more possible responders is a second communication mode that is different than the first communication mode. A first response from a first responder is received using the second communication mode. The first response is mapped to the conversation associated with the initiator based in part on the conversation identifier. The response is sent to the initiator using the first communication mode such that the first responder is anonymous to the initiator. Other implementations of this aspect include corresponding systems, apparatuses, and computer-readable media configured to perform the actions of the method.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
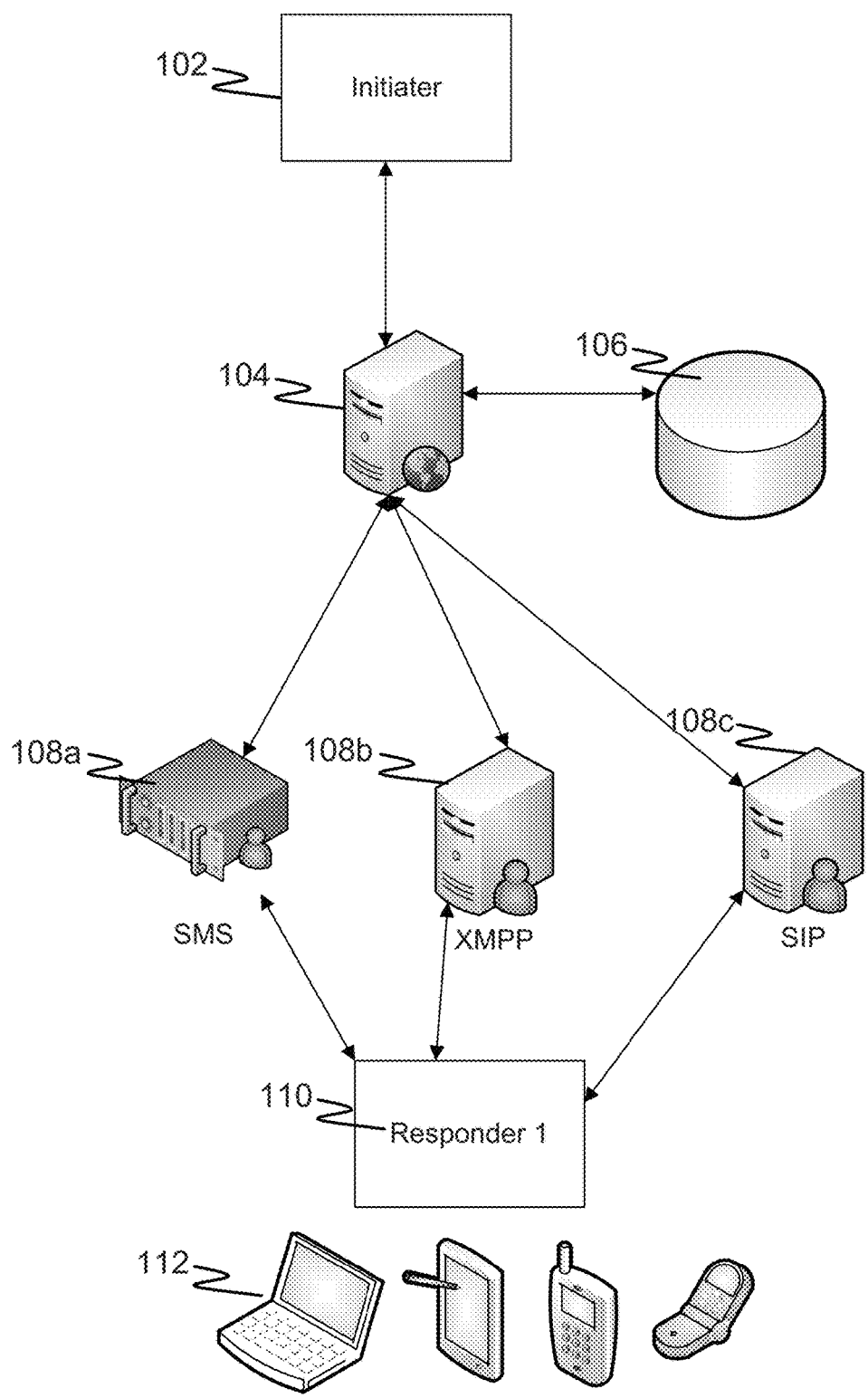
FIG. 1 is a diagram of a RTC system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Described herein are illustrative systems and methods involving the computer, protocol, communications, and internet-related fields. Various implementations add features which allows RTC to occur without the initiator of a communication being required to share a common RTC application or RTC protocol with the recipient(s) or responder(s) to that communication. Various implementations also provide for management of the communication between the initiator from a website or dedicated application, to various responders using a variety of RTC communication methods. In one implementation, these various responses are managed in such a way that the initiator sees them as unified responses within the internet website which the initiator is viewing and communicating with the responders. In some implementations, the initiator does not need to provide a destination address for the communication, and the initiator may remain anonymous to both the system and the responders. In other implementations, the initiator may identify himself to responders. In another implementation, asymmetric management of the conversation can occur, so that the initiator sees all communications from all responders but a responder only see the initiator's responses to the responder but not the responses of the other responders unless authorized to do so by the initiator or administration.

FIG. 1 is a diagram of a RTC system 100 in accordance with an illustrative embodiment. An initiator 102 can create a line of communication with a responder 110. The initiator 102 can use a web browser to visit a website or connect through a dedicated application to a server 104. From the website or application, the initiator 102 can send a communication to the server 104. The server can identify one or more responders along with one or more protocols that can be used to communicate each responder. For example, the server 104 can communicate with a responder through various protocols such as, but not limited to, SMS 108a, XMPP 108b, SIP 108c, RTP, SMTP, POP, etc. Accordingly, the responder 110 can communicate with the server using any number of devices 112 such as, but not limited to, desktop computers, notebooks, personal digital assistants, tablets, smartphones, cell phones, etc.

In various implementations, it is not necessary for the initiator 102 to identify themselves in any way to the server 104, nor to the potential responders. In one implementation, the initiator's request can be mapped to one or more potential responders based upon preferences of the responders. In one implementation, the preferences of the responders can be stored in a data store 106. The data store 106 can also store other information, such as mappings, conversations, etc. As an example of using preferences, the initiator 102 can include a selected category that is related to the initiator's desired communication. The server 104 can use the selected category in determining the potential one or more responders.

Once one or more responders have been identified, the server 104 can route the communication to the appropriate destination addresses, using RTC channels (e.g., instant messaging addresses, email addresses, text message/SMS addresses, etc.) which the one or more responders have previously provided. As described in greater detail below, the server 104 can map the various RTC channels that were used to initiate communication with each responder. This mapping can be used to allow continued communication between the initiator 102 and the responder 110.

In one implementation, the responders do not need to identify themselves in any way to the initiator. Any responses which the responders send will be managed by the system to be provided to the initiator, within the web browser window or application. These responses can be presented to the initiator and may be delivered to the initiator without presenting the originating source's identifying information (instant message address or SMS/text number). If there are multiple responders to the initiator, each responder may be visually indicated so as to separate the responses in the web browser window or application by responder, though the separation need not identify the responder. Each party is of course free to identify themselves within the actual words sent or received by them within the conversation (e.g., an initiator could send any message, "I am Sam Davis and I trust you so I am giving you my number it is (704)555-1212"). The initiator can be presented with multiple responders' communications if multiple responders reply or may be presented with the first responder only, or other selection criteria. However, in one implementation, each responder sees only their text and replies from the initiator directed to them. The responder does not see the other responders' responses. In another implementation, the text communications are sent to all parties, e.g., the initiator and the one or more responders.

As mentioned above, potential responders can provide in advance, the RTC communication addresses on which they wish to receive messages, any specific criteria for which they wish to receive messages, and the times of the day in which they wish to receive messages. Other criteria are also possible to allow further specification for messages which recipients would like to receive transmissions on their pre-defined criteria (e.g., specific keywords or jurisdictions, etc). In addition, a responder can provide criteria for when they are not available. For example, at certain times of the day, days of the week, a responder can configure their criteria to avoid getting any requests from initiators. While communication occurs in real time, the initiator and the responder are not required to share a common RTC protocol.

Accordingly, the system 100 can connect internet or application communications to real-time and near real-time technologies and back to the internet or applications. In one implementation, the system 100 allows web users (HTTP and internet-related protocols) to converse with real-time device users (SMS, XMPP, SIP, MMS, and RTC related protocols) in a two-way conversation, all while providing optional anonymity to either or both parties from the other party. As described, the system 100 allows for either the web-based use (or application user) to initiate the conversation with an RTC responder, or this system provides the description of the RTC party initiating the conversation with another RTC party or web-based user (or application user). No common software is required for the participants in the discussion (for example, each party does not need to be a subscriber to a common service).

In one implementation, the server 104 can select one or more potential responders randomly from a pool of available responders. In other implementations, the one or more potential responders are selected using some criteria. For example, one or more of user selected topics, website specific addresses, word-choice in the communication, meta-data describing the conversation topics, geographic location, RTC protocol preferences, past communications, etc. can be used to select the one or more potential responders. The initiator and potential responders do not need to know one another's profiles, addresses, real-time communication sources, or any other identifying information; since this is handled by a server that sits between the initiator and each responder. The initiator and potential responders also do not need to share a common real-time communication protocol, medium, nor software; since the sourcing, routing, and exchanging of questions and answers to the parties is handled by the server.

As an example, in one implementation a person may visit a website or use a dedicated application to initiate a discussion, ask a question, or find information about a particular good or service offered by responders. Information about the subject matter of the good, service, or information being offered may be available on the website or dedicated application. The visitor can have learned of the website in any number of manners including internet search engine results, paid advertising link, direct connect to website using domain name, link through a related website, etc. In another implementation, a user can initiate communication via a link to discuss the good, service, or information being offered. Once the initiator visits the website or opens the application there can be a portal which will allow the initiator to connect with one or more live respondents to get more information about the subject matter of the website or application. There can also be a series of drop-down items or selections which the initiator can make to aid in identifying the particular area of expertise, product, or information sought by the initiator. However, it is also possible that the initiator can begin their inquiry without being required to enter any identifying or qualifying information whatsoever. The respondents who use or subscribe to the service may have an interest in responding to inquiries or providing information about particular goods or services in a limited geographic region based on preliminary qualifying information so that functionality is built into the system and can be used based upon settings selected by the administrator, users, and/or responders.

Once the initiator asks a question, makes a statement, or enters any preliminary qualifying information which may be needed as discussed above, a chat window can open showing the beginning of a conversation thread. The initiator can be identified generically as "User, Customer, Client, Person, etc . . . " and is not required to disclose their name, e-mail address, phone number, home address, or any other identifying information to initiate the conversation. Of course, the initiator can do so on their own or after being prompted by the administrator or the responder. Not initially requiring the disclosure of information allows the initiator to feel free to engage the responders in an open dialogue about the information, goods, or services that they are seeking. Once the initiator feels comfortable with the information they have received and/or decides to purchase the goods, information, or services being offered by the responders, the initiator can then be encouraged to disclose any personal identification or contact information which may be necessary to complete the transaction. In various implementations, the initiators are able to obtain information without having to "subscribe" to any service or pay any fee to engage the responders through the use of this real-time two-way communication system. In some implementations, however, the ability to chat with initiators can be offered to the responders on a subscription, connection, auction, and/or impression basis. Ecommerce functionality can also be built into various implementations so the potential subscription, connection, auction and/or impression fees and charges can be automated.

In various implementations, the initiator can request a communication without providing any information. In one implementation, the initiator can be prompted to ask a question or provide information relevant to the subject matter disclosed on the web site or application. This information, along with any preliminary qualifying information obtained, and any information which may be available based upon the initiator's domain, etc., can be instantaneously transmitted to a pool of subscribing respondents via e-mail, SMS, and instant message who have previously provided their e-mail addresses, cellular telephone numbers, and instant message user names. For example, when after disclosing that the initiator lives in "Alaska," the initiator types "I would like information about X" all subscribers who have agreed to handle inquiries from residents of the State of Alaska will receive an e-mail, text message (SMS), and instant message that says something like "User from Alaska would like information about X." In order to provide some time for the respondents to receive, read, and respond to the communication in one implementation the initiator can be asked questions about the subject matter of the website by the use of a concierge or virtual assistant. This virtual assistant serves two important purposes, it stalls for time to allow the respondents the opportunity to respond and it engages the initiator so they do not feel like they are on hold waiting for a response. These questions can even start just after the initiator has entered the preliminary qualifying information such as "Alaska" but before the initiator has an opportunity to send the first communication. Accordingly, the responders will have additional time to engage the initiator while the concierge/virtual assistant is asking questions. Once the pre-programmed questions have been asked or the potential responders begin responding the questions can be programmed to stop.

The entire pool of potential responders can receive an SMS, MMS, e-mail, or instant message notification when an initiator has entered sufficient criteria (i.e. state, subject matter, answers to questions) that match the criteria that the responders desire to communicate with the initiator about. In one implementation, the initiator's request, question, statement, or text can be sent, without requiring any criteria, to the recipient's SMS, MMS, email, instant message or other RTC destination. In one implementation, a number of the potential responders, which number can be pre-determined by the administrator, subscribers, and/or initiator, can respond to the initiator using a real time communication of the responder's choice. For example, when a potential responder receives a SMS text message notification from the system that A user from Alaska would like additional information about product X, the responder can reply directly from his cell phone using the SMS capability of that phone or via e-mail or instant message. As another example, a web visitor, seeing a real-estate property about which they are interested, can click on a link and initiate a conversation. The conservation request can be received by a listing agent (or additional other agents on duty) for the real-estate property. In one implementation, only the first replying agent would be allowed to communicate with the initiator. In other implementations, multiple responders can communicate with the initiator. These parties, both initiator as well as the responder are not required to identify themselves to each other. The web visitor would not be required to share any software in common with the real estate agents, nor would the real-estate agents need to share any software in common with the web-visitor. The real-estate agents could be using a variety of different RTC communication methods, and all would work to affect their responses so that the web-visitor could see them in the chat window. In one implementation, the responses of the various responders and the initiator are shared with each party. In another implementation, the initiator has a separate and distinct conversation with each responder.

In one implementation, initiators are matched with responders based upon state, subject matter, answers to pre-programmed questions, IP address, metadata, syntax of language that appears in a message or response to a question, etc. An administrator, subscriber, and/or user can set a quantity limit on the number of responders who are allowed to respond to the initiator and a limit on the length of time it takes to respond.

To facilitate allowing communication using disparate forms of RTC, an intermediary proxy can handle message stream convergence and routing. The following is one example of how to technically construct a specific implementation, and in no way limits the patent to these specific technologies, as the over-arching claims extend outside specific technologies.

Figure 2:
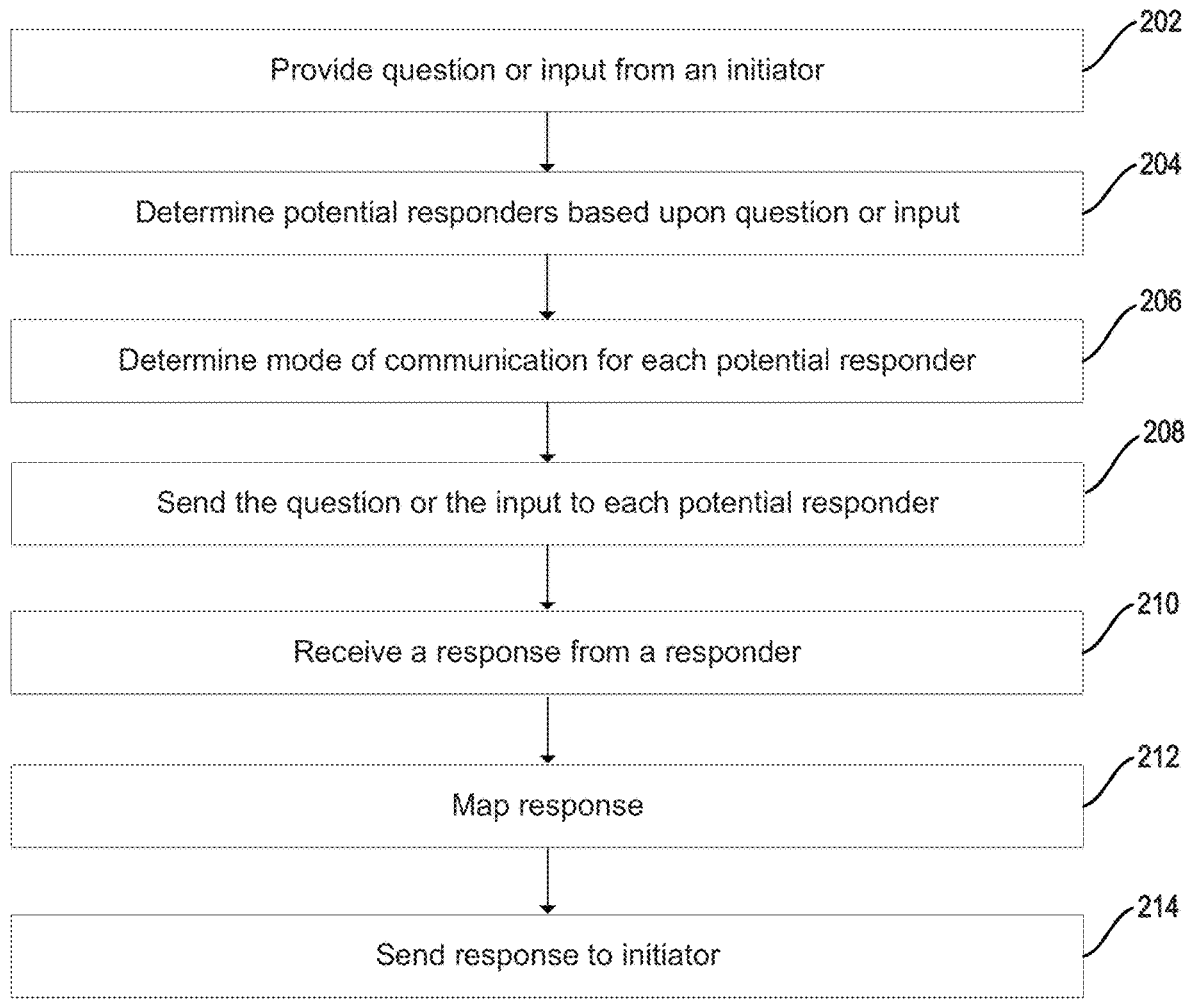
FIG. 2 is a flow diagram illustrating a process allowing RTC in accordance with an illustrative embodiment.

FIG. 2 is a flow diagram illustrating a process 200 allowing RTC in accordance with an illustrative embodiment. The process 200 can be implemented on a computing device. In one implementation, the process 200 is encoded on a computer-readable medium that contains instructions that, when executed by a computing device, cause the computing device to perform operations of process 200.

In the illustrated process 200, an initiator can ask a question or provide input within a web-based user interface (202). The question or input can be sent to a server that matches the question or input to criteria of potential responders (204). The mode of communication for each potential responder is determined (206). Using the identified modes of communication, the initiator's question is sent to the one or more responders (208). The server receives a response from one or more of the responders (210). Using information associated with the received response, the server can map the response to the initiator's question (212). After mapping, the response can be sent to the initiator and displayed in the web-based user interface (214). Communication between the initiator and the responder can continue by the server mapping the responses from the initiator and responder.

Figure 3:
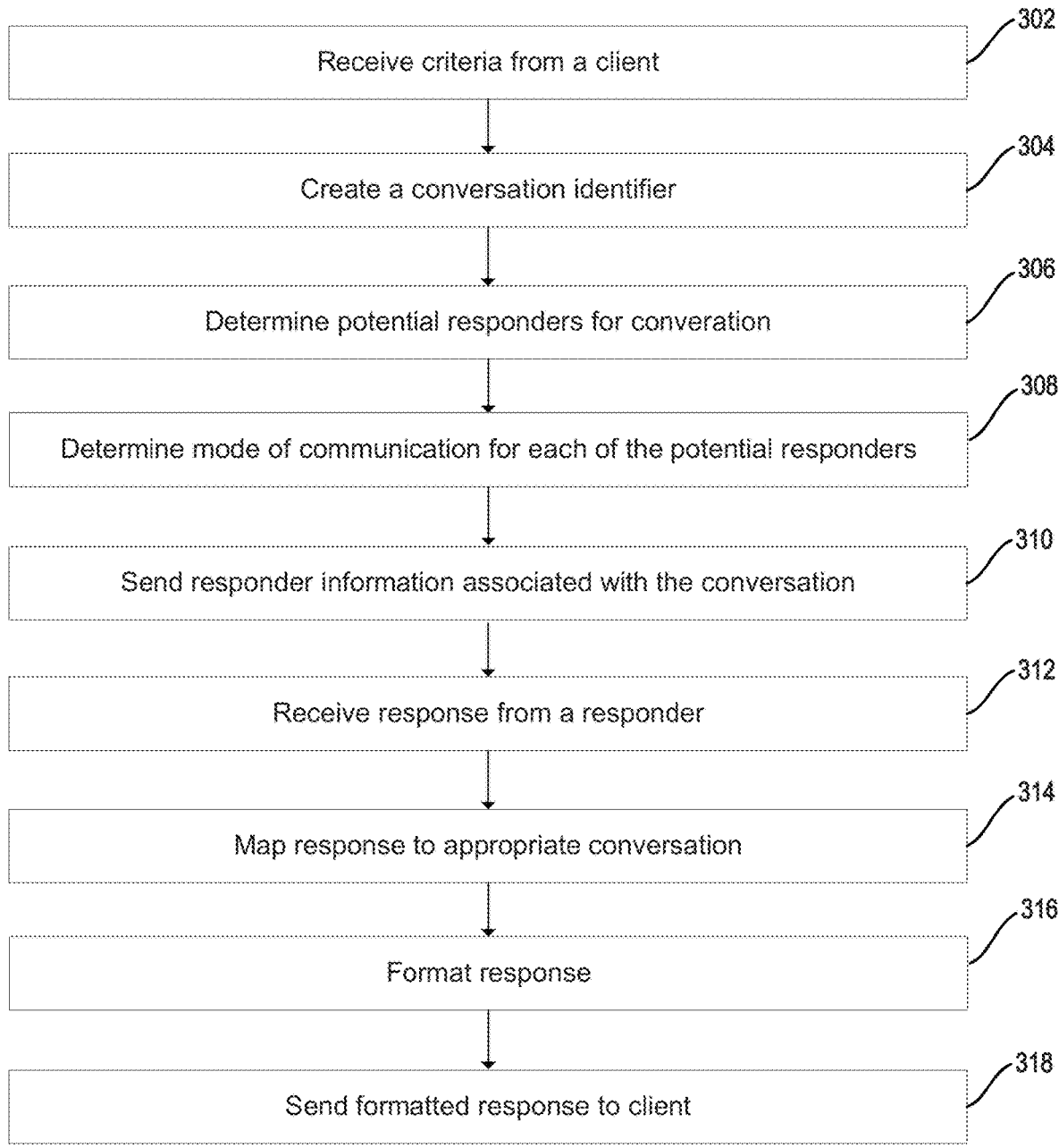
FIG. 3 is a flow diagram illustrating a process allowing RTC in accordance with an illustrative embodiment.

FIG. 3 is a flow diagram illustrating a process 300 allowing RTC in accordance with an illustrative embodiment. The process 300 can be implemented on a computing device. In one implementation, the process 300 is encoded on a computer-readable medium that contains instructions that, when executed by a computing device, cause the computing device to perform operations of process 300.

In the illustrated process 300, a client provides criteria related to a conversation that the client wishes to initiate (302). The criteria is provided to a server over a network, such as using HTTP over the internet. For example, a user can use a web browser client or application to send the criteria. Upon receipt, the server can create a conversation identifier that identifies one specific conversation associated with the client (304). For example, the conversation identifier can be a randomly generate number. The server can determine potential responders for the client's request (306). As described above, potential respondents can provide criteria for conversations that they are willing to participate in. Criteria can be based upon the time of day, day of the week, the type of question being asked, location of the client, etc. In one implementation, a data store can be queried to search for responders whose criteria match the current conversation request. For each potential responder, the mode of communication associated with the responder is determined (308). The mode of communication can also be based upon criteria, such as time of day, day of week, etc., that is provided by each responder. Information associated with the client can then be sent to each responder using the responder's requested mode of communication (310). For example, information provided by the user can be sent to one or more potential responders using various different modes of communication. For example, the client's information can be sent to a first responder as an instant message and the client's information can be sent to another responder using SMS. The server can store information associated with each message sent. This information can be used to map responses from the responders to the appropriate conversation. For example, the IP address or telephone number of a responder can be used to identify responses from responders. The server can receive one or more responses from the responders (312). If a responder has multiple possible communication mediums, the communication that the response is received on can be used as the current or active communication media for that responder. For example, if a responder can receive initiator requests through instant messaging and email, the one used by the responder to respond will be deemed the active medium. Future data from the initiator for that conversation will be sent only to the active medium. It is possible for a responder to switch communication mediums. This can be achieved by the responder replying via any medium that is not the active medium. For example, if the responder initially used email to respond, the responder can later respond using instant messaging or SMS. The server can determine the responder from the information received as part of the instant message or SMS. Once the responder is determined, the appropriate conversation can then be determined and the responders reply routed to the correct initiator as part of the on-going conversation.

In addition to a responder being able to switch communication mediums, the initiator can also switch to a different form of communication. For example, the initiator can initially ask a question using a web interface as described above. At some point during the conversation, the initiator can provide information regarding a new mode of communication to use for this conversation. For example, the initiator can provide an email address, telephone number, or instant message handle, etc. The server can use this information to forward responses from the responders to the new mode of communication rather than the initial web interface.

Using information associated with the response, the server can determine the appropriate conversation that the response belongs to (314). For example, the server can use the phone number from an SMS response and determine the conversation identifier associated with the phone number. In addition, the IP address or email address of the responder can be used to determine the appropriate conversation identifier. Other information that can be used to map a response to an established conversation includes the receiving address. For example, the phone number used to receive a response from a responder can be used alone or in conjunction with the sending telephone number to map to the correct conversation. In another implementation, the conversation identifier is sent to the responders and any response from a responder contains the conversation identifier.

The response can be formatted prior to sending to the client (316). In one implementation, any identifying information can be removed from the response. For example, a telephone number, email address, and/or IP address can be removed from the response. After mapping the response to a conversation, the response can be sent to the client (318). In one implementation, the response for the client is stored in a database. The client can poll the server and the server can send any needed responses in response to a poll. Responses from the client can also be stored in the database, thus, providing a record of the entire conversation that can be accessed at a later time by either the client or the responder.

An initiator can use any of the following to initiate a conversation: a web browser, an application utilizing XML/SOAP, WCF, binary transfer, HTTP, etc. The RTC communication between a server and a responder can use any of the following SMS, MMS, XMPP, SIP, etc. Communications can be delivered to a responder at a corresponding address specific to that communication type to initiate the conversation.

In one implementation, the initiator is able to start a conversation by visiting a website and submitting a question by typing into a text-box on the website. Alternatively, the initiator could also use a locally installed application of this system, which acts as a client to the request initiation of a conversation with the server.

The question can be inserted into a data store, for example a conversation database used to temporarily store conversations, and that conversation session is issued a Communication Identifier (CID). Each conversation string submitted may be stored in a unique table for that conversation, so that subsequent communications within that same conversation are kept together. This can be accomplished by matching the session created by the initiator and all subsequent text-based communication between the initiator and responders. The website can also contain software which provides a user interface to allow the initiator to input criteria to define their question. Examples to illustrate criteria would be a specific application like a tax preparation application, or a preferred language of the initiator, or describe which state of the United States they are seeking assistance, e.g., Missouri. Criteria can be created by explicit action by the initiator, e.g., selecting a term or category to describe the question. The criteria can also be created by implicit information, e.g., the real-estate case described above could put an address-specific link to identify the criteria for all specific conversations which are initiated from that address-specific link. As another example of implicit information, a geographic location of an initiator can be determined using the IP address of the initiator. The criteria may also be created by implicit information, e.g., a specific website address or specific sub-site can act to provide criteria. Determining the potential responders can be determined from either or both the implicit information and the explicit actions. It is also possible that no criteria could be required of the initiator. The initiator does not need to provide any contact or user-specific identification to submit to this system. The initiator can only submit their question, statement, or any text to initiate a conversation. These criteria (whether explicitly selected or implicitly determined) are submitted to a server to find any (all) matching responders with those criteria. A software process within the system then manages the communication to the appropriate responders for the specific criteria. The software process provides the text of the initiator's question to the matching responders, using the RTC communication media which each responder has provided. Multiple RTC destinations and media are possible for each specific responder. All matching responders are contacted using each of the pre-defined RTC communication channels for all matching responders.

To facilitate communications between initiators and responders, RTC address information of potential responders can be stored in a database. Each responder is treated individually, with each record maintaining the responders instant messaging, text messaging, email addresses, as well as any additional RTC contact information for that specific responder. Each responder may also provide any criteria by which they seek to be connected to initiators with questions. Examples of an RTC address would be: Example_responders_address@domainname.com; an SMS/text message contact number; and instant messaging address similar to example_responders_IM_address@jabber.org. Examples of explicit criteria for a responder would be "English Language Questions" or "tax preparation software" or questions pertaining to "Missouri." A simple example of the implicit criteria for a responder would be simply the specific URL or link which directs all the questions submitted by initiators to the SMS address/contact number of the responders. Simply by visiting that URL (E.g., http://moredeets.com/1234me) the implicit information provided to the routing rules would transmit all questions submitted by users to the SMS address/contact number of one or more specific responders.

All of this information can be stored in a database for matching of criteria, and also providing the system with RTC addresses for matches to the criteria. A hunter service can contact the database to determine matches to the criteria provided by an initiator asking a question. The hunter service provides the RTC addresses to the software process which communicates over the RTC communication media. The software process sends the text which the initiator provided to the system, over the RTC addresses provided by the hunter service. Examples to illustrate this aspect of the process would include the following; using an email service or plug-in to send the text of the initiators question to the potential responders email address; using an SMS/text message service the software process sends the text of the initiators question to all potential responders' SMS/text message addresses (phone number); and/or using an instant messaging service to send the initiator's question to all potential responders' instant messaging addresses. The CID is preserved so that responses can be mapped back into the Conversation Database, to the appropriate conversation. The message formatting service accepts all incoming messages from responders, regardless of RTC media, and standardizes the text of the responses so that they appear within the Communication database with no differentiation between the RTC method(s) used by responders.

In one implementation, all responses to the initiator's request are posted into the database. This can be configured to minimize the number of accepted responses to an initiator. The logic of the posting service is configurable. It may be configured in specific instances to allow only one responder's message to be sent through the system to the initiator, or give preference to specific RTC media types, or may allow only the first two responders to be sent through the system to the initiator, or similar rules to the above. The responder's responses which are posted to the database are retrieved by the client-side software running on the web, application, or could even be another RTC mechanism acting as an initiator.

The initiator does not have to provide any identifying information, and the responders receive no identifying information about the initiator, because all communications are coming from the addresses used by the system itself. This can be accomplished across all existing RTC communications media, as well as any additional communications media deemed appropriate for providing responses to initiators. The responders do not have to provide any identifying information to the initiator, because all communications from the responders are managed by the system, and no source address information is provided to the initiator.

The system also provides a concierge or virtual assistant service. This is provided via a software service wherein the initiator is asked pre-created questions, which are possibly different for any criteria selected. As discussed in the real-estate example above, the questions asked could be different for each real estate address/property. The routing rules for responders could be different as well for each real estate address/property. The responses by the initiator can determine the next action by the system; e.g., a "Yes" answer can continue other pre-created questions, while a "No" can cause a different text-based response from the virtual assistant or concierge. These responses can also be broadcast to the potential responders, using the same mechanisms described above. These pre-created questions can continue up to the time a responder chooses to communicate with the initiator.

In some implementations, allows an auction or bidding capability. The auction or bidding capability can not allow for responders to send in responses until the responder purchases the ability to communicate with the initiator. This can be a reverse auction or bidding service which occurs prior to connecting responders with the initiator. The initiator's question and subsequent responses to the concierge service are communicated to the potential responders. Using this information, the potential responders determine if the price at auction, reverse-auction, or bidding minimum, etc. are acceptable. If they are acceptable, the payment commitment is communicated using the above system, and then the successful bidders are allowed to communicate via the system, to the initiator.

Figure 4:
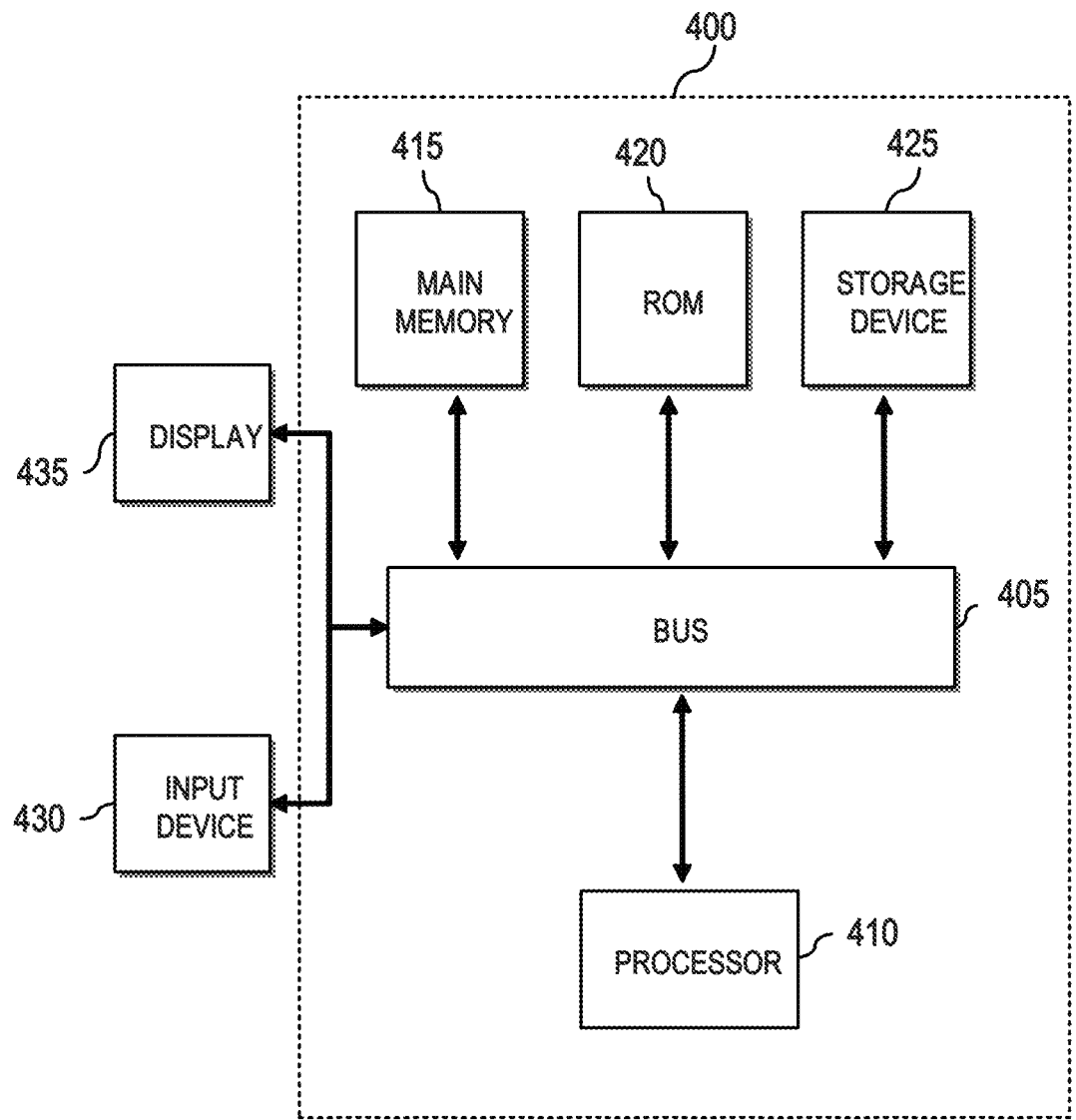
FIG. 4 is a block diagram of a computer system in accordance with an illustrative implementation.

FIG. 4 is a block diagram of a computer system in accordance with an illustrative implementation. The computing system 400 can be used to implement the web server, search service, advertisement service, etc., and includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 410 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results.

What is claimed is:

1. A system for web-based communication, the system comprising:
an electronic processor configured to:
receive a communication request, from a web browser of an unauthenticated user of a web page, initiated from the web page;
send to the web browser from a first responder a request for information for the unauthenticated user of the web browser as part of a conversation, wherein the request for information is sent based on the communication request;
receive a first communication as part of the conversation from the unauthenticated user of the web browser;
determine a conversation identifier for the conversation based on the first communication;
identify, based on the first communication, a second responder, wherein the second responder is different from the first responder;
determine a communication protocol of the second responder;
send the first communication to the second responder based on the communication protocol of the second responder;
receive, from the second responder, a first reply from the second responder based on the first communication;
determine the conversation identifier based on the first reply;
map the first reply to the web browser using the conversation identifier; and
send the first reply to the web browser.

2. The system of claim 1, wherein the electronic processor is configured to identify the first responder based on a website identifier.

3. The system of claim 1, wherein the electronic processor is further configured to end the conversation between the unauthenticated user and the first responder based on a communication from the unauthenticated user.

4. The system of claim 1, wherein an identifier of the first responder is displayed as visually distinct from an identifier of the second responder.

5. The system of claim 1, wherein the electronic processor is further configured to store the conversation comprising the first communication and the response and the conversation identifier in a persistent data store, wherein the conversation identifier is associated with the conversation within the persistent data store.

6. The system of claim 5, wherein the electronic processor is further configured to:
receive a second reply from a third different responder; and
store the second reply in the persistent data store as part of the conversation using the conversation identifier.

7. The system of claim 1, wherein the electronic processor is further configured to send a past conversation of the unauthenticated user to the second responder.

8. The system of claim 1, wherein the first responder is a virtual responder.

9. The system of claim 1, wherein the electronic processor is further configured to send, before the first communication is received from the web browser, prompts to the web browser to request information from the user.

10. The system of claim 1, wherein the electronic processor is further configured to determine an active communication protocol of the unauthenticated user, wherein the first reply is sent to the unauthenticated user via the active communication protocol of the unauthenticated user.

11. The system of claim 10, wherein the electronic processor is further configured to receive a request to change the active communication protocol of the unauthenticated user to a different communication protocol, wherein a second reply is sent to the unauthenticated user via the changed active communication protocol of the unauthenticated user.

12. The system of claim 1, wherein the electronic processor is further configured to create the conversation identifier based on receipt of the first communication.

13. The system of claim 11, wherein the changed active communication protocol is short message service (SMS).

14. The system of claim 1, wherein the electronic processor is configured to identify the second responder based on a geolocation of the first communication.

15. The system of claim 1, wherein the electronic processor is configured to identify the second responder based on the content of the first communication.

16. The system of claim 1, wherein the electronic processor is further configured to receive an answer to a question from the web browser, wherein the electronic processor is configured to identify the second responder based on the answer.

17. The system of claim 1, wherein the electronic processor is configured to use a session identifier to determine the conversation identifier.

18. A method for web-based communication comprising operations performed on an electronic processor, the operations comprising:
receiving a communication request, from a web browser of an unauthenticated user of a web page, initiated from the web page;
sending to the web browser from a first responder a request for information for the unauthenticated user of the web browser as part of a conversation, wherein the request for information is sent based on the communication request;
receiving a first communication as part of the conversation from the unauthenticated user of the web browser;
determining a conversation identifier for the conversation based on the first communication;
identifying, based on the first communication, a second responder, wherein the second responder is different from the first responder;
determining a communication protocol of the second responder;
sending the first communication to the second responder based on the communication protocol of the second responder;
receiving, from the second responder, a first reply from the second responder based on the first communication;
determining the conversation identifier based on the first reply;
mapping the first reply to the web browser using the conversation identifier;
sending the first reply to the web browser.

19. The method of claim 18, wherein the operations further comprise identifying the first responder based on a website identifier.

20. The method of claim 18, wherein the operations further comprise ending the conversation between the unauthenticated user and the first responder based on a communication from the unauthenticated user.

* * * * *